United States Patent
Gessner et al.

(10) Patent No.: US 11,621,856 B2
(45) Date of Patent: Apr. 4, 2023

(54) GENERATING A DOMAIN NAME SYSTEM CONTAINER IMAGE TO CREATE AN INSTANCE OF A DOMAIN NAME SYSTEM CONTAINER

(71) Applicants: Jürgen Gessner, Forstinning (DE); Christian Knierim, Munich (DE)

(72) Inventors: Jürgen Gessner, Forstinning (DE); Christian Knierim, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 11 days.

(21) Appl. No.: 17/231,185

(22) Filed: Apr. 15, 2021

(65) Prior Publication Data
US 2021/0328809 A1 Oct. 21, 2021

(30) Foreign Application Priority Data
Apr. 20, 2020 (EP) .................................... 20170397

(51) Int. Cl.
*G06F 13/00* (2006.01)
*H04L 9/32* (2006.01)
(Continued)

(52) U.S. Cl.
CPC ........ *H04L 9/3247* (2013.01); *H04L 61/4511* (2022.05); *H04L 63/02* (2013.01); *H04L 67/10* (2013.01)

(58) Field of Classification Search
CPC ... H04L 9/3247; H04L 61/4511; H04L 63/02; H04L 67/10; H04L 41/0806;
(Continued)

(56) References Cited

U.S. PATENT DOCUMENTS

2002/0161745 A1 10/2002 Call
2015/0281111 A1 10/2015 Carl
(Continued)

FOREIGN PATENT DOCUMENTS

CN 106133688 A 11/2016
CN 106302771 A 1/2017
(Continued)

OTHER PUBLICATIONS

RFID Platform as a Service, Containerized Ecosystem, Feasibility and Security Impact Analysis; Lukas Kypus et al.; Advances in Electrical and Electronic Engineering; 2015 (Year: 2015).*
(Continued)

*Primary Examiner* — Kenneth R Coulter
(74) *Attorney, Agent, or Firm* — Lempia Summerfield Katz LLC

(57) ABSTRACT

A method is provided for storing at least one domain name system container image, wherein the domain name system container image is configured to create at least one domain name system container instance in a domain name system infrastructure. The method includes: creating at least one item of signed domain name system information, wherein the at least one item of signed domain name system information is created by a cryptographic signature of an item of domain name system information, wherein the cryptographic signature is created outside the domain name system server infrastructure; creating at least one domain name system container image, wherein the at least one domain name system container image has the signed domain name system information and at least one item of domain name system server software; and storing the at least one domain name system container image in a container registry.

18 Claims, 2 Drawing Sheets

(51) Int. Cl.
  *H04L 9/40* (2022.01)
  *H04L 61/4511* (2022.01)
  *H04L 67/10* (2022.01)

(58) Field of Classification Search
  CPC . H04L 63/123; H04L 67/1036; G06F 9/5077;
    G06F 21/602; G06F 9/45558
  USPC ...... 709/245; 718/105, 102; 726/5–7, 18, 19
  See application file for complete search history.

(56) References Cited

U.S. PATENT DOCUMENTS

| | | | |
|---|---|---|---|
| 2016/0134639 A1 | 5/2016 | Kaminsky | |
| 2020/0074092 A1 | 3/2020 | Fliam et al. | |
| 2021/0328809 A1* | 10/2021 | Gessner | H04L 67/1036 |

FOREIGN PATENT DOCUMENTS

| | | |
|---|---|---|
| CN | 106790483 A | 5/2017 |
| CN | 107241428 A | 10/2017 |
| CN | 108566449 A | 9/2018 |

OTHER PUBLICATIONS

CoreDNS "Sign—Sign Plugin for CoreDNS", XP055734073, Last modified Feb. 6, 2020; pp. 1-5.
European Search Report for European Patent Application No. 20170397.2-1218 dated Oct. 15, 2020.
Kloosterhuis, Robert; "Setting up a vSphere lab with CoreDNS in Docker—The Fluffy Admin", XP055734813, 2019. pp. 1-17.
McKendrick, Russ: "Mastering Docker", XP055460815, Published 2015. pp. 1-384.
Jiang Chunmao, et al. "Security Defending Policies Based On DNS Attacking" vol. 22 (2004). pp. 1-8 with English machine translation.

* cited by examiner

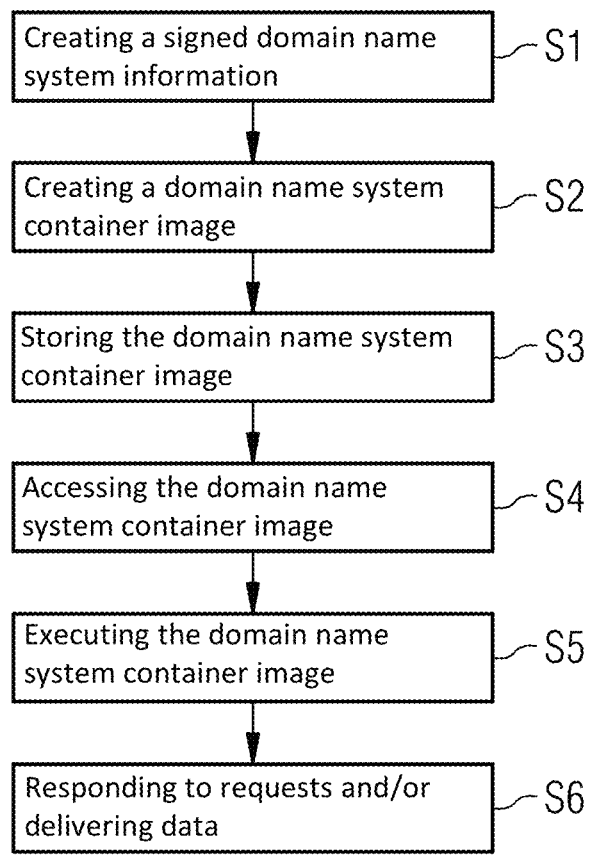

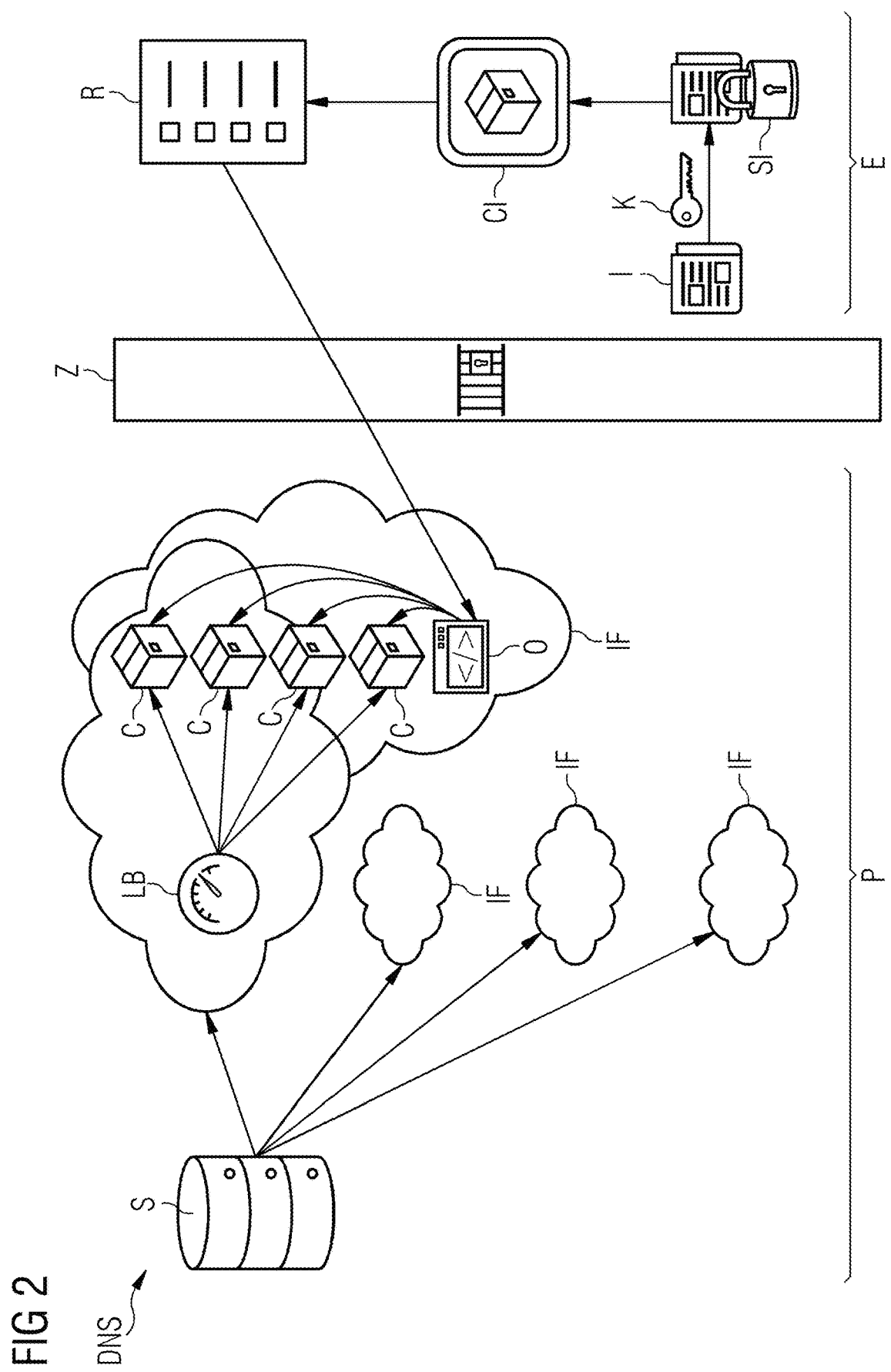

GENERATING A DOMAIN NAME SYSTEM CONTAINER IMAGE TO CREATE AN INSTANCE OF A DOMAIN NAME SYSTEM CONTAINER

The present patent document claims the benefit of European Patent Application No. 20170397.2, filed Apr. 20, 2020, which is hereby incorporated by reference in its entirety.

TECHNICAL FIELD

The present disclosure relates to a method for storing a domain name system container image in order to create at least one domain name system container instance in a domain name system infrastructure. The present disclosure also relates to a computer program product and to a computer-readable medium.

BACKGROUND

In the domain name system (DNS), information for a DNS domain is provided in a decentralized manner via DNS servers in networks. Individual terminals or their applications may read and use this information either by directly requesting this information from a DNS server stored for a DNS domain or by using for this purpose a DNS resolver which is provided by the provider, for example, and then forwards the request to the DNS server of the DNS domain.

DNS information provided in a DNS infrastructure includes the resolution of DNS names to an IP address or publishes, for example, inputs and outputs of the email infrastructure which are used by senders or recipients in a DNS domain. Furthermore, any desired further DNS information for the DNS domain may be distributed via the DNS infrastructure in networks. This DNS information is provided via port 53 UDP and TCP.

Reliable communication is not possible without this DNS information provided by the DNS infrastructure. Therefore, high requirements in terms of availability and integrity apply to DNS information. Asymmetrical encryption methods are used to protect integrity. The key pairs used when protecting integrity include a private key and a public key. The private key is used to effect the signature and the public key is used to validate the signature. In particular, because the private key is used to guarantee integrity, the private key may not be out of the control of a DNS domain owner.

In particular, attackers use the provision of a DNS service via UDP by virtue of the DNS servers of a DNS domain being randomly bombarded with requests in a targeted manner with the aid of botnets or the like and a dDOS attack therefore being relatively easy to perform and also occurring frequently in recent times. All DNS servers of a DNS domain are simple to attack on the Internet because the number of DNS servers stored in external DNS registers may be restricted to four DNS servers, to eight servers, or ten servers in some cases, and it suffices—if there are further DNS servers which are stored in the DNS zone—to attack these externally registered servers and therefore to suppress the availability of the DNS information for the DNS domain.

DNS servers of a DNS domain may currently be protected from attacks using the following mechanisms and the availability of the DNS information for the DNS domain may be retained.

The DNS servers of a DNS domain are equipped with sufficiently large computing capacities.

A plurality of DNS servers are provided to the outside in a clustered manner using load balancers.

A caching proxy or a firewall is placed in front of the DNS servers and blocks requests from known attackers and does not allow them to pass through to the DNS servers.

The DNS protocol itself provides caching mechanisms which provide that DNS resolvers may buffer already requested DNS information for the period defined by the DNS domain owner. However, this mechanism does not prevent an attacker from being able to directly attack the DNS server.

In addition, DNS servers of a DNS domain may be protected from attacks using the Domain Name System Security Extension (DNSSEC) protocol and the authenticity and integrity of the DNS information may be guaranteed. The integrity and authenticity of each individual entry may be protected via cryptographic signatures using the DNSSEC protocol and the entry may therefore be validated by DNS resolvers. DNSSEC may therefore be considered to be an addition to the mechanisms which retain the availability of the DNS information for the DNS domain. DNSSEC provides that the delivered DNS information may be checked for correctness.

SUMMARY AND DESCRIPTION

The object of the disclosure is to provide an improved solution for providing the integrity and authenticity of DNS information and guaranteeing the availability of DNS information for a DNS domain in the event of an overload.

The scope of the present disclosure is defined solely by the appended claims and is not affected to any degree by the statements within this summary. The present embodiments may obviate one or more of the drawbacks or limitations in the related art.

The disclosure relates to a method for storing at least one domain name system container image (DNS container image). The domain name system container image is configured to create at least one domain name system container instance (DNS container instance) in a domain name system infrastructure (DNS infrastructure). The method includes creating at least one item of signed domain name system information (signed DNS information). The at least one item of signed domain name system information is created by a cryptographic signature of an item of domain name system information, and the cryptographic signature is created outside the domain name system server infrastructure, in particular in a domain name system domain owner (DNS domain owner).

The method further includes creating at least one domain name system container image. The at least one domain name system container image has the signed domain name system information and at least one item of domain name system server software.

The method further includes storing the at least one domain name system container image in a container registry.

One aspect of the disclosure involves providing signed domain name system information in a container-based domain name system infrastructure by at least one domain name system container instance, wherein the signed domain name system information is created outside the domain name system infrastructure. Asymmetrical encryption methods are used to sign the domain name system information (e.g., integrity protection of the domain name system information). The key pairs used when protecting integrity include a private key and a public key. The private key (e.g., credential) is used to effect the signature and the public key is used to validate the signature. In particular, because the private key is used to guarantee integrity, the private key may not be out of the control of a DNS domain owner. Therefore, the signed domain name system information is created outside the domain name system infrastructure.

The domain name system (DNS) is a service in many IP-based networks. The main task of the DNS is to respond to requests for name resolution. The DNS functions in a similar manner to directory assistance. The user knows the domain (the name of a computer in the Internet which is evident to people), for example, example.org. The user transmits this domain to the Internet as a request. The domain is then converted there by the DNS into the associated IP address (the "connection number" in the Internet), (e.g., an IPv4 address of the form 192.0.2.42 or an IPv6 address such as 2001:db8:85a3:8d3:1319:8a2e:370:7347), and thus leads to the correct computer. A domain name system infrastructure is the infrastructure on which the DNS is based, and which has a DNS namespace, a DNS server, a DNS resolver, and a DNS protocol. The domain name system infrastructure provides the DNS information for a namespace for a network. It includes the DNS software and the DNS zone file for a DNS domain and is operated on a plurality of geographically distributed computer systems (DNS servers) for reasons of availability. DNS resolvers may query the DNS infrastructure for a DNS domain and may therefore carry out a name resolution for a requesting client.

The disclosure provides various advantages. The creation of domain name system container instances makes it possible to achieve dynamically extreme increases in the computing capacities for responding to DNS requests which cannot be achieved at this speed with a solution based on virtual machines. This is due to the container-based architecture which has many times fewer resources than a complete operating system of a virtual machine. In addition, use may be advantageously made of the fact that cloud providers may provide considerably higher bandwidths and computer resources than certain on-premise computing centers. The effort needed for a DDOS attack on a DNS infrastructure is therefore dynamically increased to such an extent that the prospects of the attack being successful decrease and the availability of the DNS service is therefore guaranteed.

Because all DNS information for a DNS domain is already included in the DNS container instance, there is no need for any zone transfers which distribute the DNS information in the DNS master/slave method. As a result, a DNS container instance may take care of only providing DNS information for requesting clients. The synchronization effort carried out in the conventional DNS master/slave method using zone transfers is dispensed with, thus saving resources in the DNS server application operated in the DNS container instance.

DNS information is delivered with integrity and authenticity protection by a cryptographic signature using DNSSEC. The private signature keys needed to protect integrity are held outside the DNS server environment in a secure area at the DNS domain owner and never leave the territory of the DNS domain owner. This prevents unauthorized changes, for example by a cloud operator/provider.

As a result of the cryptographic signature and integrity protection, it may be accepted that a cloud operator/provider (as conventional in container-as-a-service infrastructures) does not provide any information relating to the cloud architecture operated thereby and a detailed risk check is not carried out for the DNS server infrastructure. In addition, a more cost-effective, less protected infrastructure may be purchased as a result of the integrity protection.

In one development of the disclosure, the creation of the cryptographic signature or the signed domain name system information outside the domain name system server infrastructure means that the cryptographic signature is carried out at the DNS domain owner.

According to one aspect of the disclosure, a plurality of items of DNS information, which may also be referred to as DNS zone files, may be held in the domain name system container instances/domain name system container images for different DNS namespaces. However, there must be at least one item of DNS information.

According to one aspect of the disclosure, the domain name system infrastructure exists at least once, but may be set up in an identical manner in replicates at different locations and provided, in particular, by a cloud provider.

According to one aspect of the disclosure, the container registry is a software repository in which the domain name system container images are stored. The container registry may be either centrally provided for all domain name system infrastructures or alternatively provided at each location at which a domain name system infrastructure is formed.

The cryptographic signature has the advantage that the integrity and authenticity of the DNS information are protected, and it is therefore provided that the DNS information is authentic and has not been changed in an unauthorized manner.

In a further development of the disclosure, the method further includes accessing the at least one domain name system container image in the container registry and executing the at least one domain name system container image, wherein the at least one domain name system container instance is created in the domain name system infrastructure by executing the at least one domain name system container image.

The acts of accessing the at least one domain name system container image and executing the at least one domain name system container image may be carried out by a DNS domain owner itself or, in an alternative embodiment, by a cloud provider or provider of the container infrastructure.

The execution of the at least one domain name system container image may also be referred to as activation of a DNS container instance or as orchestration.

Orchestration is carried out by orchestration software. The orchestration software may be separately set up for each individual location at which the domain name system infrastructure is set up or may centrally control all runtime environments/domain name system infrastructures which have been set up at the different locations.

If the acts of accessing the at least one domain name system container image and executing the at least one domain name system container image are carried out by a cloud provider/provider, the latter only requires access to the container registry. In this case, the transfer point would be the container registry. In this case, the DNS domain owner places the domain name system container image containing the signed domain name system information in the container registry. The container registry may be either on the side of the DNS domain owner or with the cloud provider.

If a DNS domain owner does not have any access to the orchestration software for carrying out the acts of accessing the at least one domain name system container image and executing the at least one domain name system container image, the provider checks periodically (for example, hourly) whether there is a new version of the domain name system container image and, if appropriate, loads the current version of the domain name system container image.

In a further development, the DNS domain owner has access to the orchestration software and to the relevant functions in the orchestration software, and the performance of the acts of accessing the at least one domain name system container image and executing the at least one domain name system container image may be triggered by the DNS domain owner.

In a further development, the method includes responding to requests sent to the at least one domain name system container instance and/or delivering data from the at least one domain name system container instance. Individual terminals or their applications may read DNS information from domain name system container instances and may use the information either by directly requesting it from the DNS server or domain name system container instance stored for a DNS domain or by using for this purpose a DNS resolver which is provided by the provider, for example, and then forwards the request to the DNS server or the domain name system container instance of the DNS domain.

In a further development, the at least one item of signed domain name system information is created with access protection. The access protection may be established, for example, by a secure location such as a secure area in a computing center. This has the advantage that the integrity of the domain name system information is protected, and the information cannot be manipulated. This has the advantage that the data cannot be changed by attackers or unauthorized persons.

In a further development, the access protection is created by a firewall. This has the advantage that the at least one item of signed domain name system information is created at a location protected by a firewall.

In a further development, keys of the access protection are protected by a hardware security module. Alternatively, the keys may be protected, for example, by a cryptographic off-line signature. In this case, use is made of encrypted data partitions which are in place only during the signature operation. An administrator of the server, on which the signature is performed, inputs a password for decryption.

Alternatively, the access protection is provided by virtue of the fact that the location at which the cryptographic signature is performed may be reached via a hop server and/or a VPN tunnel, for example, wherein the VPN tunnel may be set up by two-factor authentication and a connection may be initiated only by the domain name system information.

Alternatively, the access protection is provided by virtue of the fact that the location at which the cryptographic signature is performed is not exposed to the outside (for example, to the Internet).

In a further development, the domain name system server infrastructure is provided by at least one cloud network. The cloud network may be provided at all locations by the same cloud provider or may be provided at each location by different cloud providers. This has the advantage that scaling and use of a variable number of domain name system container instances may be achieved.

In a further development, the cryptographic signature is created as a DNSSEC signature. The DNSSEC signature has the advantage that integrity protection of the DNS information is created thereby. The signature keys needed to protect integrity are held outside the DNS server environment in a secure area at the DNS domain owner and never leave the territory of the DNS domain owner. This prevents unauthorized changes, for example, by a cloud operator/provider.

In a further development, a degree of utilization of the domain name system container instance is determined. The degree of utilization, which may also be referred to as utilization of the individual DNS container instances, is checked permanently or repeatedly at predefined times and/or periodically by orchestration software. This has the advantage that the degree of utilization is known at the predefined times. An imminent overload may therefore be detected promptly.

In a further development, a number of domain name system container instances is determined on the basis of the degree of utilization. This has the advantage that there is a reaction to the degree of utilization and an overload may be avoided.

According to one aspect, in the event of an attack, the number of domain name system container instances for each location of the DNS infrastructure is automatically increased for the duration of the attack and considerably more capacity is therefore temporarily provided than would be the case in a server-based solution. In the extreme case, the container-based infrastructure makes it possible to temporarily select the capacity to be so high that the computing capacity provided exceeds the capacity otherwise required for the conventional base load by a multiple in the case of peak loads.

In a further development, the number is set by connecting and disconnecting a domain name system container instance. A container-based infrastructure which scales DNS container instances up and down depending on the load is therefore proposed for each individual DNS infrastructure location.

In a further development, the connection and/or disconnection is carried out by orchestration software. The DNS container instances are therefore scaled up and down at each location of the DNS infrastructure using the orchestration software which also permanently checks the utilization of the individual DNS container instances.

According to one aspect, a load balancer at each location distributes incoming requests to the domain name system container instances. The configuration of the load balancer is independently adapted to the orchestration software each time a domain name system container instance is scaled up and down or is connected and/or disconnected. If the orchestration software did not do this, newly connected domain name system container instances may not be addressed/queried from the outside or incoming requests would come to nothing if domain name system container instances are no longer available.

In a further development, the connection and/or disconnection is implemented by a container-as-a-service solution. An alternative would be for the domain name system container instances to be operated as containers on dedicated machines.

The disclosure also includes a computer program product having a computer program, wherein the computer program may be loaded into a memory device of a computing unit, wherein the acts of a method are carried out with the computer program when the computer program is executed on the computing unit.

The disclosure also includes a computer-readable medium on which a computer program is stored, wherein the computer program may be loaded into a memory device of a computing unit, wherein the acts of a method are carried out with the computer program when the computer program is executed on the computing unit.

BRIEF DESCRIPTION OF THE DRAWINGS

The special features and advantages of the disclosure become clear from the following explanations of a plurality of exemplary embodiments on the basis of the schematic drawings, in which:

FIG. 1 depicts a flowchart of the method according to an embodiment.

FIG. 2 depicts a schematic illustration of a domain name system according to an embodiment.

DETAILED DESCRIPTION

FIG. 1 shows a flowchart of the method. The method includes act S1: creating at least one item of signed domain name system information, wherein the at least one item of signed domain name system information is created by a cryptographic signature of an item of domain name system information, wherein the cryptographic signature is created outside the domain name system server infrastructure.

The method further includes act S2: creating at least one domain name system container image, wherein the at least one domain name system container image has the signed domain name system information and at least one item of domain name system server software.

The method further includes act S3: storing the at least one domain name system container image in a container registry.

These acts are used to store at least one domain name system container image, wherein the domain name system container image is configured to create at least one domain name system container instance in a domain name system infrastructure.

In one variant for creating at least one domain name system container instance in a domain name system infrastructure, the method may be supplemented with act S4: accessing the at least one domain name system container image in the container registry; and act S5: executing the at least one domain name system container image, wherein the at least one domain name system container instance is created in the domain name system infrastructure by executing the at least one domain name system container image.

In one variant for responding to requests, the method may be supplemented with act S6: responding to requests sent to the at least one domain name system container instance and/or delivering data from the at least one domain name system container instance. At least one domain name system container instance is formed at each location for this purpose.

FIG. 2 shows two areas: the area of a provider of a cloud network P/a cloud provider on the left, and the area of a domain name system domain owner E on the right.

A domain name system DNS is situated in the area of the provider of the cloud network P/the cloud provider. The domain name system DNS has a domain name system server S. The domain name system server S manages four domain name system infrastructures IF at different locations. The domain name system infrastructures IF are set up in an identical manner in replicates in Frankfurt, Singapore, New York, Buenos Aires, for example, and are provided by the provider of the cloud network P. The provider of the cloud network P may be a different provider at each location or may be the same provider at each location.

Each domain name system infrastructure IF has at least one domain name system container instance C (the domain name system container instances C are illustrated only for one domain name system infrastructure IF in FIG. 1).

Each domain name system infrastructure IF also has a load balancer L and orchestration software O. The load balancer L measures a degree of utilization of the domain name system container instances C. The orchestration software O controls scaling of the number of domain name system container instances C on the basis of the degree of utilization. In the case of high utilization of the domain name system container instances C, the number of domain name system container instances C is increased and, in the case of low utilization of the domain name system container instances C, the number of domain name system container instances C is reduced.

The orchestration software O and the load balancer L may be separately set up for each individual location at which the domain name system infrastructure IF is set up or may centrally control all runtime environments/domain name system infrastructures IF which have been set up at the different locations. In FIG. 2, the orchestration software O and the load balancer L are formed separately in each domain name system infrastructure IF (only illustrated for one domain name system infrastructure IF).

FIG. 2 also shows access protection Z. The access protection Z separates the area of the provider of the cloud network P on the left in FIG. 2 from the area of the domain name system domain owner E on the right in FIG. 2. The domain name system domain owner E is the owner of a domain name system domain within the domain name system infrastructures IF. In a manner protected by the access protection Z, an item of domain name system information I is provided with a cryptographic signature K, (e.g., DNSSEC), on the side of the domain name system domain owner E and the integrity of the information is therefore protected. As a result, an item of signed domain name system information SI is created. The signed domain name system information SI is stored, together with an item of domain name system software in the form of a domain name system container image CI, in a container registry R.

The container registry R may be either on the side of the DNS domain owner E, as illustrated in FIG. 2, or with the provider of the cloud network P. On the side of the cloud provider P, the container registry may either be centrally provided for all domain name system infrastructures IF or may alternatively be provided at each location at which a domain name system infrastructure IF is formed.

A domain name system container instance C is created in the domain name system infrastructure by accessing the domain name system container image CI in the container registry R and executing the domain name system container image CI. The system container instance C is created by the orchestration software O.

The operations of accessing the domain name system container image CI and executing the domain name system container image CI may be carried out by a DNS domain owner E itself or, in an alternative embodiment, by the provider of the cloud network P/cloud provider or provider of the container infrastructure.

The execution of the at least one domain name system container image may also be referred to as activation of a DNS container instance or as orchestration. The orchestration is carried out by the orchestration software O.

If the acts of accessing the at least one domain name system container image CI and executing the at least one domain name system container image CI are carried out by a provider of the cloud network P/cloud provider, the latter only requires access to the container registry R, and the container registry R may still be formed on the side of the DNS domain owner E to the right of the access protection Z, as illustrated in FIG. 2. In this case, the DNS domain owner E places the domain name system container image CI containing the signed domain name system information SI in the container registry R. The container registry R may be either on the side of the DNS domain owner E or with the cloud provider P.

If a DNS domain owner E does not have any access to the orchestration software O for carrying out the acts of accessing the domain name system container image CI and executing the domain name system container image CI, the provider of the cloud network P/cloud provider checks repeatedly or periodically (e.g., hourly) and/or at predefinable times whether there is a new version of the domain name system container image CI and, if appropriate, loads the new/current version of the domain name system container image CI. The orchestration software O then executes the domain name system container image CI and creates a domain name system container instance C.

In a further development, the DNS domain owner has access to the orchestration software or to the relevant functions in the orchestration software and the performance of the acts of accessing the at least one domain name system container image and executing the at least one domain name system container image may be triggered by the DNS domain owner.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

Although the disclosure has been illustrated and described more specifically in detail by the exemplary embodiments, the disclosure is not restricted by the disclosed examples and other variations may be derived therefrom by a person skilled in the art without departing from the scope of protection of the disclosure.

LIST OF REFERENCE SIGNS

C Domain name system container instance
CI Domain name system container image
DNS Domain name system
E Domain name system domain owner
I Domain name system information
IF Domain name system infrastructure
K Cryptographic signature
LB Load balancer
O Orchestration software
P Provider of the cloud network
R Container registry
S Domain name system server
SI Signed domain name system information
Z Access protection
Sj Act 1, j=[1; 6]

The invention claimed is:

1. A method for storing at least one domain name system container image, wherein the at least one domain name system container image is configured to create at least one domain name system container instance in a domain name system infrastructure, the method comprising:

creating at least one item of signed domain name system information, wherein the at least one item of signed domain name system information is created by a cryptographic signature of an item of domain name system information, and wherein the cryptographic signature is created outside the domain name system infrastructure;

creating the at least one domain name system container image having the at least one item of signed domain name system information and at least one item of domain name system server software; and storing the at least one domain name system container image in a container registry.

2. The method of claim 1, further comprising:
accessing the at least one domain name system container image in the container registry; and
executing the at least one domain name system container image, wherein the at least one domain name system container instance is created in the domain name system infrastructure by executing the at least one domain name system container image.

3. The method of claim 2, further comprising:
responding to requests sent to the at least one domain name system container instance and/or delivering data from the at least one domain name system container instance.

4. The method of claim 1, further comprising:
responding to requests sent to the at least one domain name system container instance and/or delivering data from the at least one domain name system container instance.

5. The method of claim 1, wherein the at least one item of signed domain name system information is created with access protection.

6. The method of claim 5, wherein the access protection is created by a firewall.

7. The method of claim 6, wherein keys of the access protection are protected by a hardware security module.

8. The method of claim 5, wherein keys of the access protection are protected by a hardware security module.

9. The method of claim 1, wherein the domain name system infrastructure is provided by at least one cloud network.

10. The method of claim 1, wherein the cryptographic signature is created as a Domain Name System Security Extension (DNSSEC) signature.

11. The method of claim 1, wherein a degree of utilization of a domain name system container instance of the at least one domain name system container instance is determined.

12. The method of claim 11, wherein a number of domain name system container instances is determined based on the degree of utilization.

13. The method of claim 12, wherein the number is set by connecting and disconnecting one domain name system container instance of the at least one domain name system container instance.

14. The method of claim 13, wherein the connecting and/or the disconnecting is carried out by orchestration software.

15. The method of claim 14, wherein the connecting and/or the disconnecting is implemented by a container-as-a-service solution.

16. The method of claim 13, wherein the connecting and/or the disconnecting is implemented by a container-as-a-service solution.

17. A non-transitory computer program product comprising a computer program, wherein the computer program is configured to be loaded into a memory device of a computing unit, wherein the computer program, when executed on the computing unit, causes to the computing unit to:
- create at least one item of signed domain name system information, wherein the at least one item of signed domain name system information is created by a cryptographic signature of an item of domain name system information, and wherein the cryptographic signature is created outside a domain name system infrastructure;
- create at least one domain name system container image having the at least one item of signed domain name system information and at least one item of domain name system server software; and
- store the at least one domain name system container image in a container registry.

18. A non-transitory computer-readable medium on which a computer program is stored, wherein the computer program is configured to be loaded into a memory device of a computing unit, wherein the computer program, when executed on the computing unit, causes the computing unit to:
- create at least one item of signed domain name system information, wherein the at least one item of signed domain name system information is created by a cryptographic signature of an item of domain name system information, and wherein the cryptographic signature is created outside a domain name system infrastructure;
- create at least one domain name system container image having the at least one item of signed domain name system information and at least one item of domain name system server software; and
- store the at least one domain name system container image in a container registry.

* * * * *